United States Patent
Inoue

(10) Patent No.: US 12,372,149 B2
(45) Date of Patent: Jul. 29, 2025

(54) VEHICLE DRIVE DEVICE

(71) Applicant: AISIN CORPORATION, Aichi (JP)

(72) Inventor: Ryohei Inoue, Kariya (JP)

(73) Assignee: AISIN CORPORATION, Kariya (JP)

( * ) Notice: Subject to any disclaimer, the term of this patent is extended or adjusted under 35 U.S.C. 154(b) by 181 days.

(21) Appl. No.: 18/031,111

(22) PCT Filed: Oct. 27, 2021

(86) PCT No.: PCT/JP2021/039639
§ 371 (c)(1),
(2) Date: Apr. 10, 2023

(87) PCT Pub. No.: WO2022/092145
PCT Pub. Date: May 5, 2022

(65) Prior Publication Data
US 2023/0406082 A1    Dec. 21, 2023

(30) Foreign Application Priority Data

Oct. 28, 2020   (JP) ................................. 2020-180911

(51) Int. Cl.
*F16H 57/021*   (2012.01)
*B60K 1/00*     (2006.01)
(Continued)

(52) U.S. Cl.
CPC ......... *F16H 57/021* (2013.01); *F16H 57/037* (2013.01); *B60K 2001/001* (2013.01);
(Continued)

(58) Field of Classification Search
CPC .... B60K 1/00; B60K 2001/001; H02K 7/006; H02K 7/116; F16H 57/02; F16H 57/021;
(Continued)

(56) References Cited

U.S. PATENT DOCUMENTS

| 7,786,640 | B2 * | 8/2010 | Sada | ............... B60K 6/365 310/98 |
| 8,397,845 | B2 * | 3/2013 | Yoshida | ............ B60K 6/26 180/65.22 |

(Continued)

FOREIGN PATENT DOCUMENTS

| EP | 4 012 901 A1 | 6/2022 |
| JP | 2009-262859 A | 11/2009 |

(Continued)

OTHER PUBLICATIONS

Feb. 19, 2024 Extended European Search Report issued in European Patent Application No. 21886262.1.
(Continued)

*Primary Examiner* — James J Taylor, II
(74) *Attorney, Agent, or Firm* — Oliff PLC

(57) ABSTRACT

A case body that is integrally formed so as to form a first housing chamber including a rotary electric machine housing chamber that houses a rotary electric machine and a gear housing chamber that houses a plurality of gears and second housing chamber that houses an inverter device includes a peripheral wall portion that surrounds an outer side of rotary electric machine and gears in radial direction, partition wall that partitions first and second housing chambers, and a partition member disposed between the rotary electric machine housing chamber and the gear housing chamber. The partition wall is formed on both sides in an axial direction across partition member so as to extend in axial direction from a position where partition wall overlaps rotary electric machine on outer side in radial direction to a position where partition wall overlaps at least one of the gears on outer side in radial direction.

8 Claims, 11 Drawing Sheets

(51) Int. Cl.
*F16H 57/02* (2012.01)
*F16H 57/037* (2012.01)

(52) U.S. Cl.
CPC .............. *F16H 2057/02034* (2013.01); *F16H 2057/02052* (2013.01)

(58) Field of Classification Search
CPC ......... F16H 57/031; F16H 57/037–038; F16H 2057/02052; F16H 2057/02034
See application file for complete search history.

(56) References Cited

U.S. PATENT DOCUMENTS 11,996,756 B2 *  5/2024  Nakamatsu ............ B60K 17/04
12,081,080 B2 *  9/2024  Nakamura .............. B60L 50/51

FOREIGN PATENT DOCUMENTS

| JP | 2017-229174 A | 12/2017 |
| WO | 2020/202963 A1 | 10/2020 |

OTHER PUBLICATIONS

Jan. 11, 2022 International Search Report issued in International Patent Application No. PCT/JP2021/039639.

* cited by examiner

VEHICLE DRIVE DEVICE

TECHNICAL FIELD

The present disclosure relates to a vehicle drive device including a rotary electric machine, a plurality of gears, a differential gear mechanism, an inverter device, and a case.

BACKGROUND ART

Japanese Unexamined Patent Application Publication No. 2017-229174 (JP 2017-229174 A) discloses an electromechanical integrated unit (1) including a rotary electric machine (3), a speed reducer (11), and an inverter device (4) (the symbols in parentheses in the background art are those in the referenced document). The speed reducer (11) is a transmission mechanism that transmits a driving force of the rotary electric machine (3) to wheels. The rotary electric machine (3) and the inverter device (4) are housed in a common housing (2) integrally having a rotary electric machine housing portion (21) and an inverter housing portion (22). The speed reducer (11) is housed in a speed reducer housing (11a) separate from the common housing (2). The inverter device (4) is housed in the inverter housing portion (22) disposed above the rotary electric machine housing portion (21) that houses the rotary electric machine (3).

RELATED ART DOCUMENTS

Patent Documents

Patent Document 1: Japanese Unexamined Patent Application Publication No. 2017-229174 (JP 2017-229174 A)

SUMMARY OF THE DISCLOSURE

Problem to be Solved by the Invention

In the electromechanical integrated unit described above, the inverter device is disposed in an area that overlaps the rotary electric machine when viewed in a vertical direction. That is, the size of the vehicle drive device tends to increase because the housing is enlarged in the vertical direction to secure a housing space for the inverter device. If an attempt is made to suppress the enlargement of the housing in the vertical direction, it is necessary to enlarge the housing space for the inverter device in a horizontal direction. In a case where the common housing (2) and the speed reducer housing (11a) are structured separately as in JP 2017-229174 A, the thickness of the common housing (2) and the thickness of the speed reducer case (11a) in the horizontal direction (in this case, an axial direction along a rotation axis) may increase. Further, the housing spaces of the rotary electric machine housing portion (21) and the speed reducer housing (11a) may have an unnecessary space. That is, even if the sizes of the rotary electric machine (3) and the speed reducer (11) to be housed remain unchanged, the size of the vehicle drive device in the horizontal direction (axial direction) increases.

In view of the above background, there is a demand to provide a vehicle drive device in which a rotary electric machine, a drive transmission mechanism including a plurality of gears, and an inverter device are housed in a case while suppressing the increase in the size of the entire device in the vertical direction and the horizontal direction.

Means for Solving the Problem

In view of the above, a vehicle drive device includes a rotary electric machine, a plurality of gears provided in a power transmission path from the rotary electric machine, a differential gear mechanism configured to distribute a driving force transmitted from the rotary electric machine via the plurality of gears to a pair of wheels, and an inverter device configured to control drive of the rotary electric machine. The vehicle drive device further includes a case including a case body that is integrally formed so as to form a first housing chamber that houses the rotary electric machine and the plurality of gears and a second housing chamber that houses the inverter device. The first housing chamber includes a rotary electric machine housing chamber that houses the rotary electric machine, and a gear housing chamber that houses the plurality of gears. The case body includes a peripheral wall portion that surrounds a radially outer side of the rotary electric machine and the gears, a partition wall that partitions the first housing chamber and the second housing chamber, and a partition member disposed between the rotary electric machine housing chamber and the gear housing chamber in the first housing chamber. Assuming that a direction along a rotation axis of the rotary electric machine is an axial direction, the partition wall is formed on both sides in the axial direction across the partition member so as to extend in the axial direction from a position where the partition wall overlaps the rotary electric machine on the radially outer side to a position where the partition wall overlaps at least one of the gears on the radially outer side.

According to this structure, a wide disposition area in the axial direction can be secured for the inverter device. Thus, it is possible to suppress the increase in the size of the case in a direction orthogonal to the axial direction (for example, the vertical direction). Since the case body is integrally formed so as to form the first housing chamber and the second housing chamber, the number of components of the case can be reduced. With the partition member, the rotary electric machine housing chamber and the gear housing chamber can appropriately be formed in the integrally formed case body. The number of components of the case can be reduced compared to a structure including a case member having the rotary electric machine housing chamber and a case member having the gear housing chamber. Since the partition wall is formed on both sides in the axial direction across the partition member, it is easy to secure the rigidity of the first housing chamber, the rigidity of the second housing chamber, and the rigidity of the partition wall. That is, according to this structure, it is possible to provide the vehicle drive device in which the rotary electric machine, the drive transmission mechanism including the plurality of gears, and the inverter device are housed in the case while suppressing the increase in the size of the entire device in the vertical direction and the horizontal direction.

Further features and advantages of the vehicle drive device will be clarified from the following description of exemplary and non-limiting embodiments with reference to the drawings.

MODES FOR CARRYING OUT THE DISCLOSURE

Hereinafter, embodiments of the present disclosure will be described with reference to the drawings. FIGS. 1 to 6 show an example of a vehicle drive device 100 according to a first embodiment. FIGS. 8 to 11 show an example of a vehicle drive device 100 according to a second embodiment. FIG. 7 is a schematic circuit block diagram of an electric system common to the first embodiment and the second embodiment. The same reference symbols are used for elements showing the same concept in the first embodiment and the second embodiment.

Figure 6:
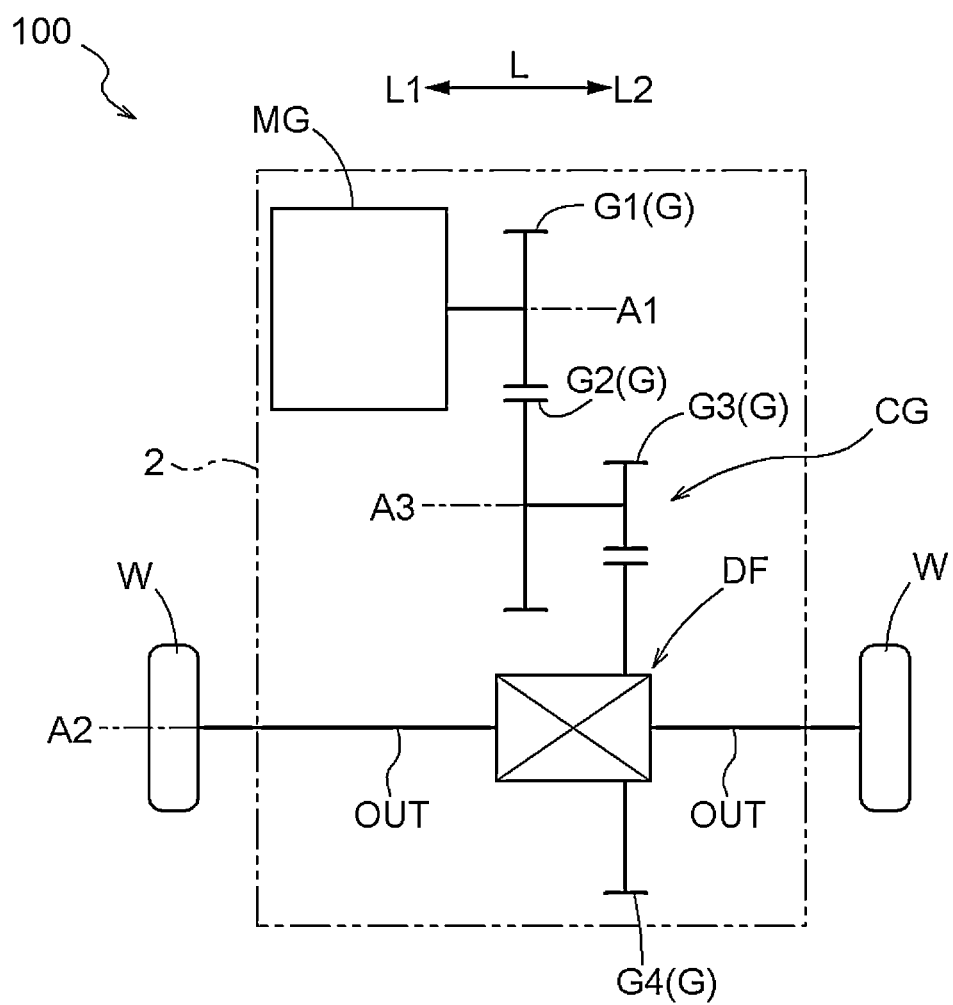
FIG. 6 is a skeleton diagram of the vehicle drive device of the first embodiment.
Figure 7:
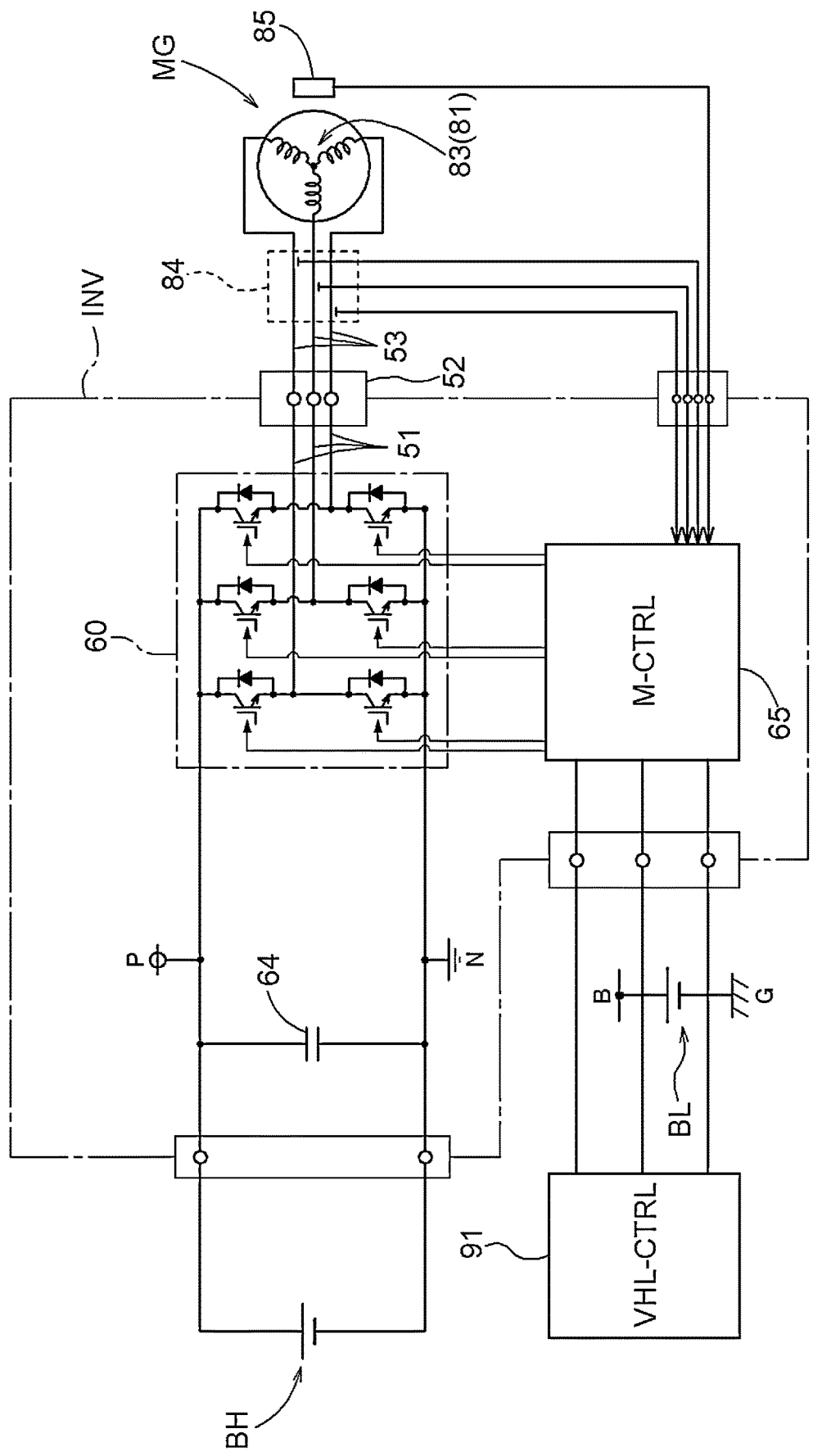
FIG. 7 is a schematic circuit block diagram of an electric system for driving a rotary electric machine.
Figure 11:
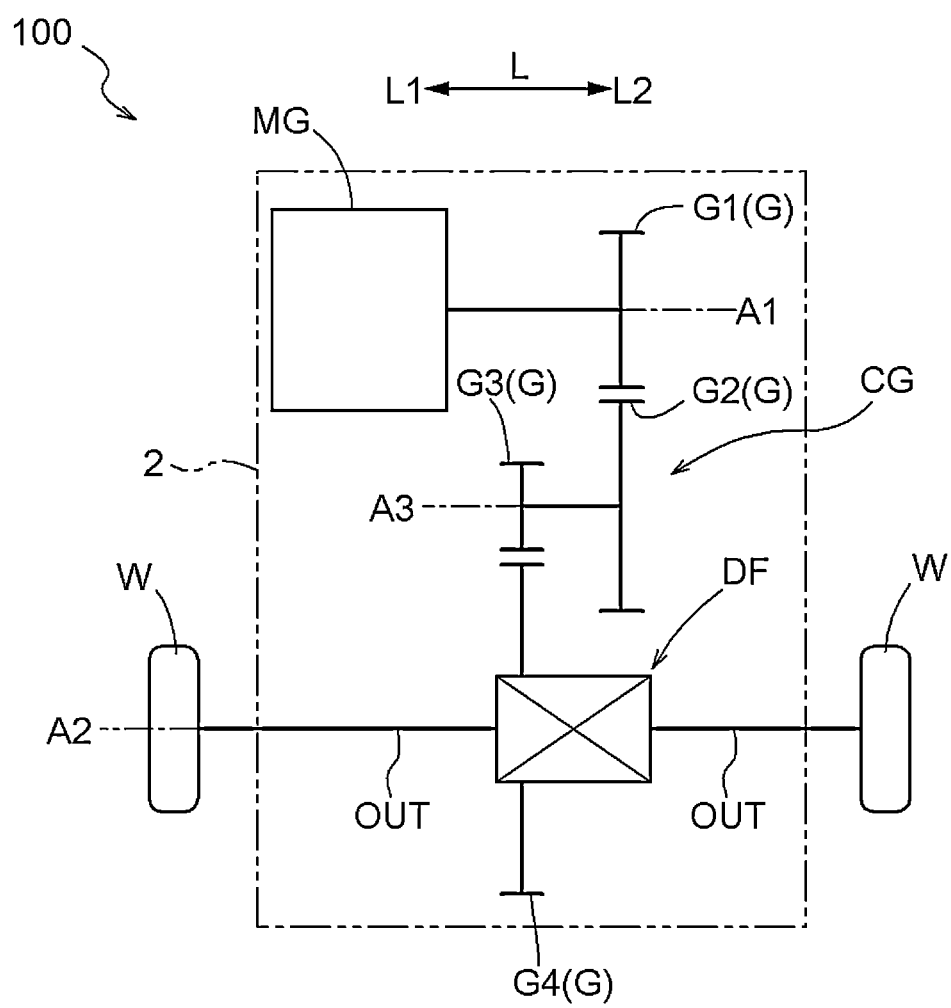
FIG. 11 is a skeleton diagram of the vehicle drive device of the second embodiment.

As shown in FIGS. 6 and 11, the vehicle drive device 100 includes, in common between the first embodiment and the second embodiment, a rotary electric machine MG disposed on a first axis A1, output members OUT disposed on a second axis A2 that is a different axis parallel to the first axis A1 and drivingly connected to wheels W, a plurality of gears G provided in a power transmission path from the rotary electric machine MG and configured such that a driving force from the rotary electric machine MG is transmitted to the gears G, and a differential gear mechanism DF that distributes the driving force transmitted from the rotary electric machine MG via the plurality of gears G to the wheels. The plurality of gears G also includes gears structuring a counter gear mechanism CG. In common between the first embodiment and the second embodiment, the counter gear mechanism CG is disposed on a third axis A3 that is a different axis parallel to the first axis A1 and the second axis A2. In the vehicle drive device 100, the plurality of gears G including the counter gear mechanism CG and the differential gear mechanism DF are provided in this order from the rotary electric machine MG side in the power transmission path connecting the rotary electric machine MG serving as a power generation device and the wheels W.

As described above, the axis of the rotary electric machine MG (first axis A1) and the axis of the output member OUT (second axis A2) are disposed separately in parallel to each other. The axis of the differential gear mechanism DF is also the second axis A2. The axis of the counter gear mechanism CG (third axis A3) is disposed in parallel to the first axis A1 and the second axis A2. That is, the first axis A1, the second axis A2, and the third axis A3 are virtual axes that are different from each other and are disposed in parallel to each other.

In the following description, a direction parallel to the first axis A1 will be referred to as "axial direction L". Since the first axis A1 and the second axis A2 are parallel to each other, the axial direction L is also parallel to the second axis A2. Since the third axis A3 is parallel to the first axis A1 and the second axis A2, the axial direction L is also parallel to the third axis A3. One side in the axial direction L (in the present embodiment, a side where the rotary electric machine MG is disposed with respect to the plurality of gears G) will be referred to as "first axial side L1" and the opposite side will be referred to as "second axial side L2".

Further, a direction orthogonal to each of the first axis A1, the second axis A2, and the third axis A3 will be referred to as "radial direction R" with respect to each axis. When it is not necessary to distinguish the axis to be used as a reference, or when the axis to be used as a reference is clear, the direction may be simply referred to as "radial direction R". Further, a direction along the vertical when the vehicle drive device 100 is attached to a vehicle will be referred to as "vertical direction V". In the present embodiment, a first vertical side V1 that is one side in the vertical direction V is an upper side, and a second vertical side V2 that is the other side is a lower side. When the vehicle drive device 100 is attached to the vehicle in parallel to a horizontal plane, one direction of the radial direction R agrees with the vertical direction V.

A direction orthogonal to the axial direction L and the vertical direction V will be referred to as "width direction H". One side in the width direction H will be referred to as "first widthwise side H1" and the other side will be referred to as "second widthwise side H2". Similarly to the vertical direction V, one direction of the radial direction R agrees with the width direction H. In the following description, terms related to the direction, the position, and the like of each member represent concepts that include a state in which there is a difference due to an error that is allowed in manufacturing. In addition, the direction of each member represents a direction of the member that is assembled to the vehicle drive device 100. In the present embodiment, the width direction H corresponds to a longitudinal direction of the vehicle when the vehicle drive device 100 is attached to the vehicle.

The vehicle drive device 100 includes an inverter device INV that controls drive of the rotary electric machine MG, and a case 1 that houses the rotary electric machine MG, the plurality of gears G, the differential gear mechanism DF, and the inverter device INV (see FIGS. 1, 2, 4, 8, 9, etc.). The case 1 includes a case body 11 that is integrally formed so as to form a device housing chamber 5 (first housing chamber) that houses the rotary electric machine MG and the plurality of gears G and an inverter housing chamber 3 (second housing chamber) that houses the inverter device INV. The term "integrally formed" refers to, for example, a unitary member made of a common material as a single die casting. The device housing chamber 5 also houses a part of the differential gear mechanism DF and the output members OUT.

Figure 1:
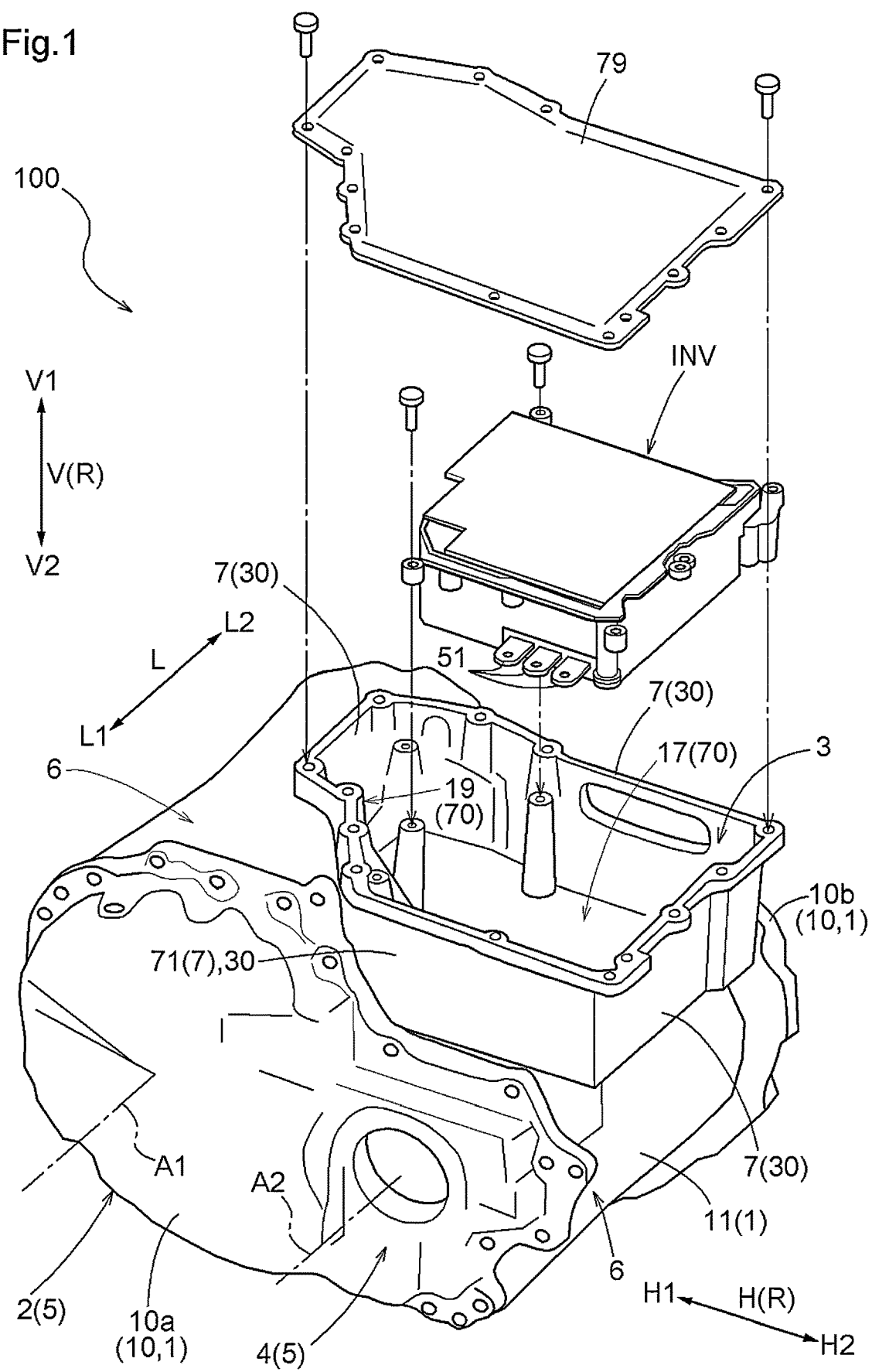
FIG. 1 is an exploded perspective view showing an example of a vehicle drive device of a first embodiment.
Figure 2:
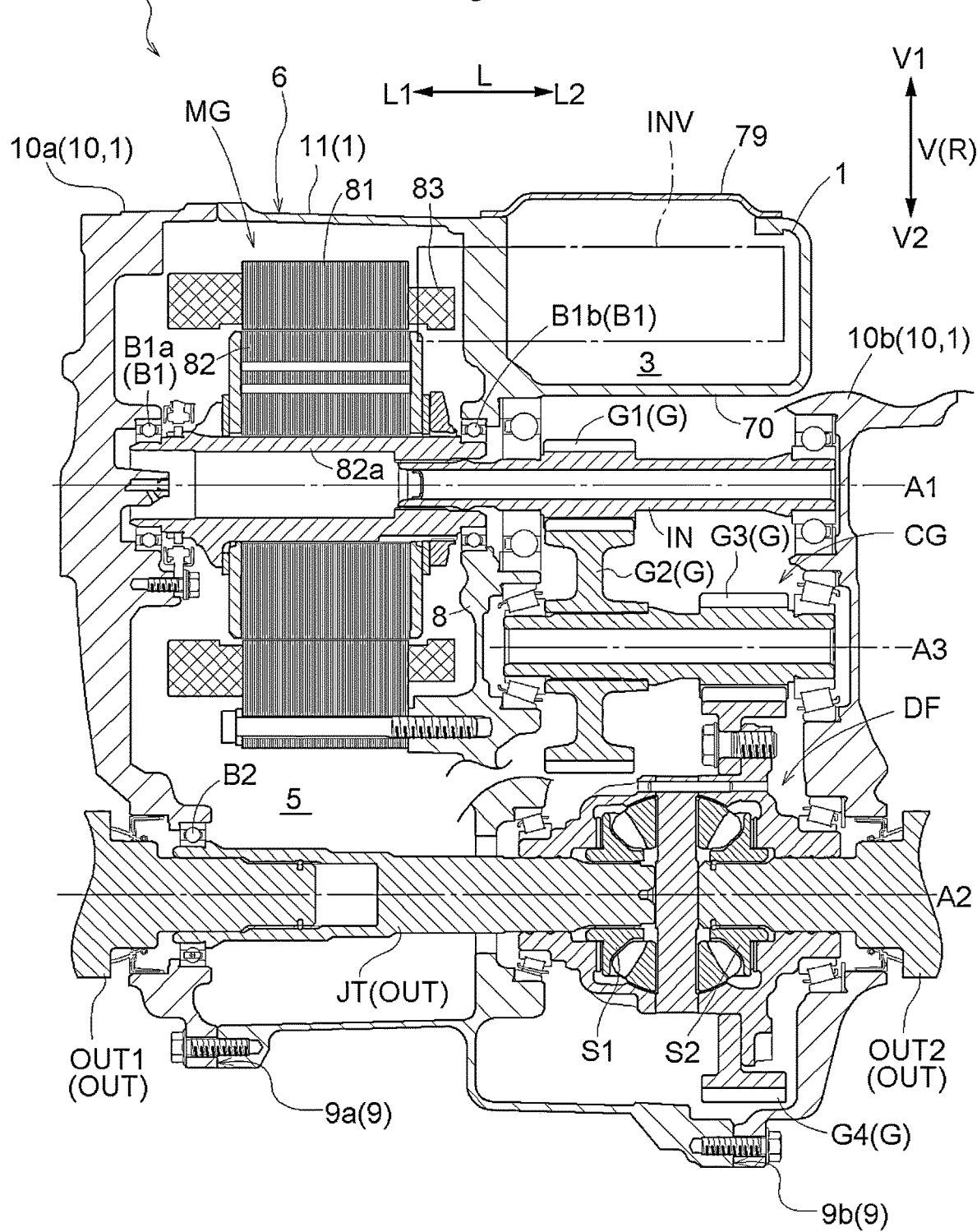
FIG. 2 is an axial sectional view of the vehicle drive device of the first embodiment.
Figure 8:
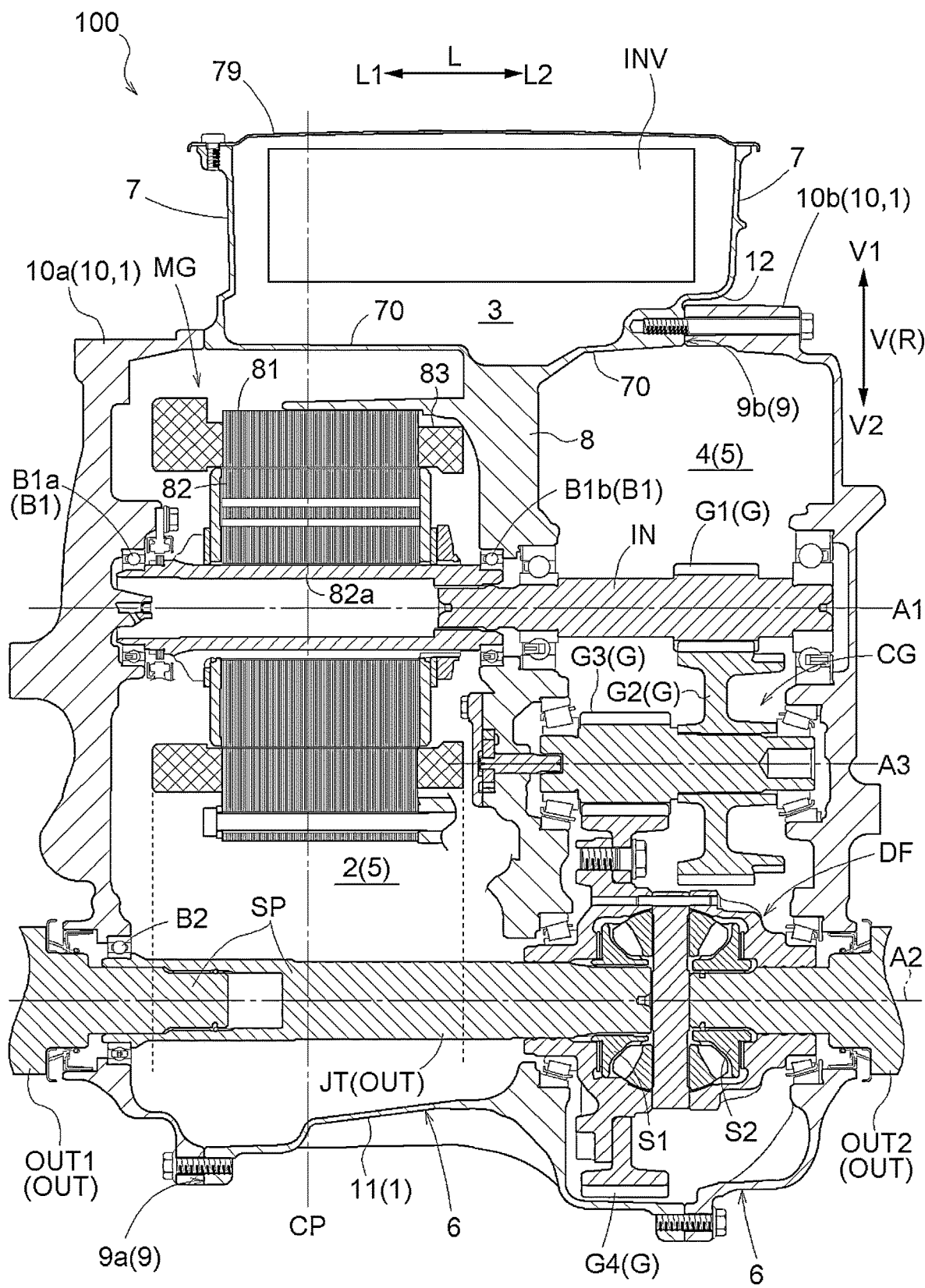
FIG. 8 is an axial sectional view of a vehicle drive device of a second embodiment.

As shown in FIGS. 1, 2, 8, etc., the case 1 includes, in addition to the case body 11, cover portions 10 including a first cover portion 10a joined to the case body 11 from the first axial side L1 and a second cover portion 10b joined to the case body 11 from the second axial side L2. The device housing chamber 5 and the inverter housing chamber 3 are partitioned by a partition wall 70 described later. The device housing chamber 5 is formed as a space surrounded by the first cover portion 10a, the partition wall 70 of the case body 11, and the second cover portion 10b.

Figure 9:
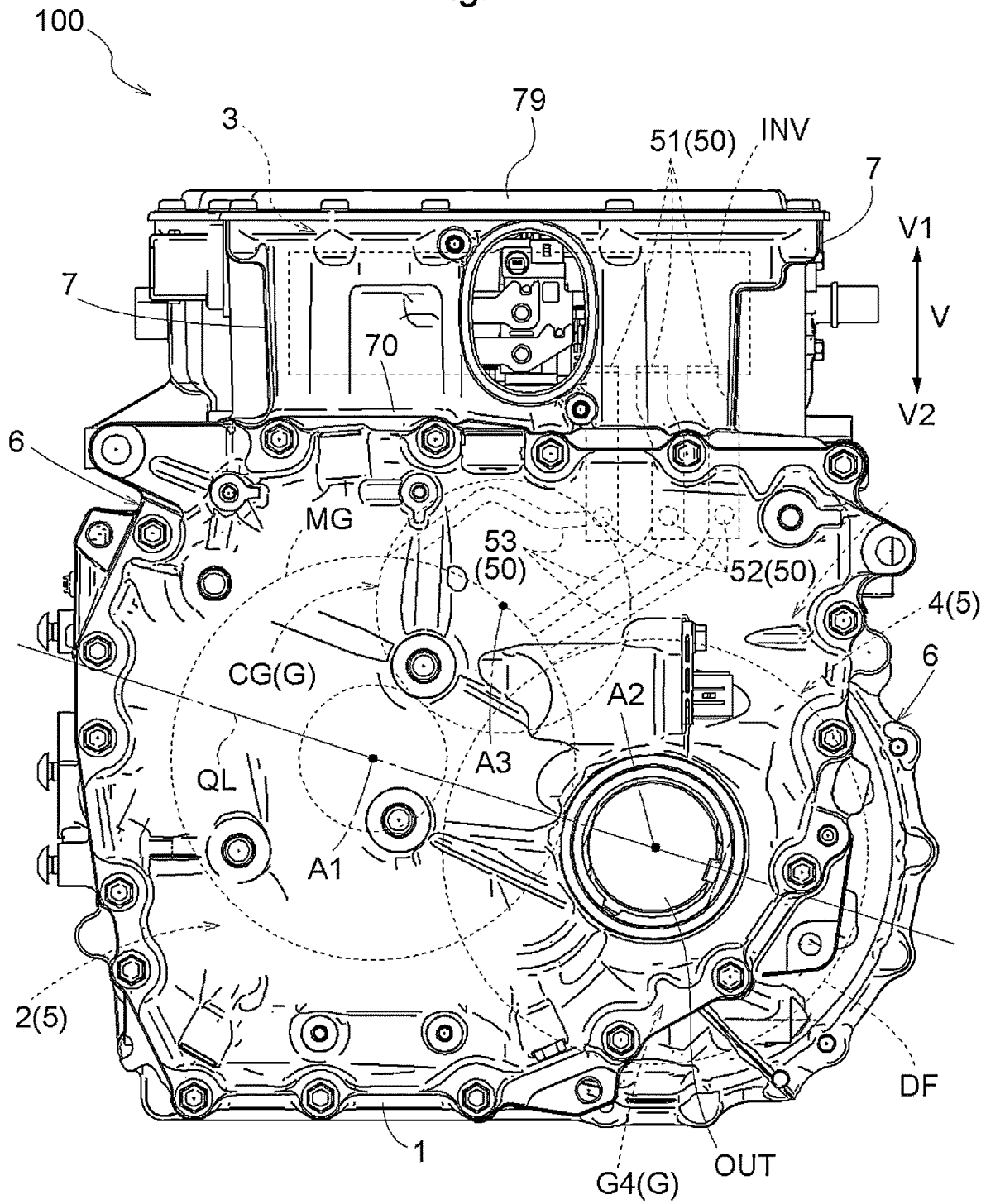
FIG. 9 is a diagram of the vehicle drive device of the second embodiment when viewed in the axial direction.
Figure 10:
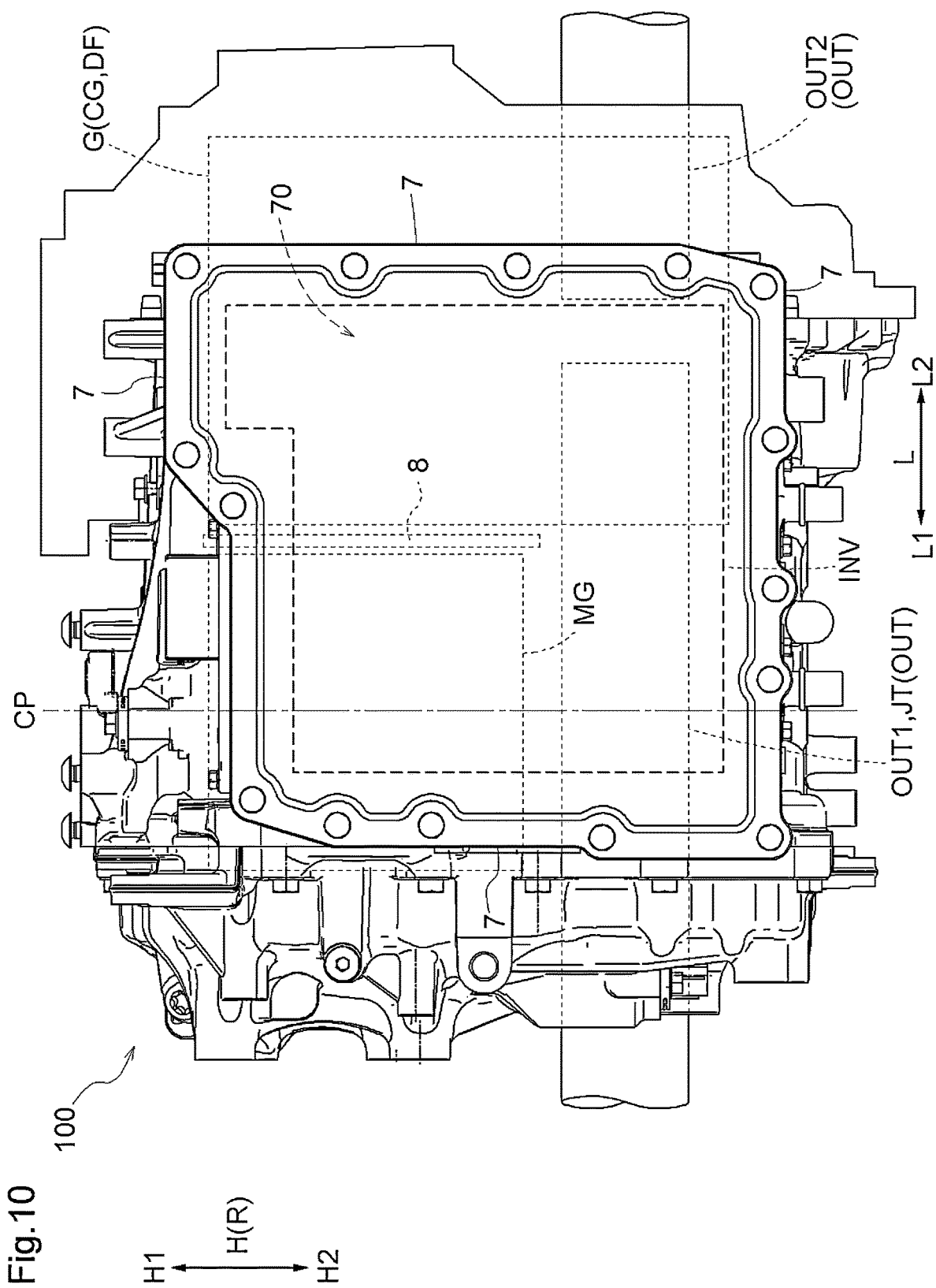
FIG. 10 is a top view of the vehicle drive device of the second embodiment.

As shown in FIGS. 1 to 4, 8, 9, etc., the inverter housing chamber 3 is formed as a space surrounded by side wall portions 7 erected from the partition wall 70 along the vertical direction V, a cover member 79 joined to the ends of the side wall portions 7 on the first vertical side V1, and the partition wall 70 of the case body 11. As described later, the partition wall 70 in the first embodiment includes a vertical partition wall 17 that partitions the device housing chamber 5 and the inverter housing chamber 3 in the vertical direction V, and a widthwise partition wall 19 that partitions the device housing chamber 5 and the inverter housing chamber 3 in the width direction H (see FIGS. 1, 4, etc.). As shown in FIGS. 8 and 9, the partition wall 70 of the second embodiment partitions the device housing chamber 5 and the inverter housing chamber 3 in the vertical direction V (corresponding to the vertical partition wall 17).

The rotary electric machine MG is a rotary electric machine (motor/generator) that operates by multi-phase alternating current (for example, three-phase alternating current), and can function as both an electric motor and a generator. As shown in FIG. 7, the rotary electric machine MG receives electric power supplied from a high-voltage battery BH (high-voltage direct current power source) to perform power running, or supplies (regenerates) electric power generated by the inertial force of the vehicle to the high-voltage battery BH.

As shown in FIGS. 2, 8, etc., the rotary electric machine MG includes a stator 81 fixed to the case 1 or the like, and a rotor 82 rotatably supported on a radially inner side of the stator 81. The stator 81 includes a stator core and stator coils 83 wound around the stator core, and the rotor 82 includes a rotor core and permanent magnets disposed in the rotor core. As shown in FIGS. 2, 6, 8, and 15, the rotor 82 of the rotary electric machine MG is drivingly connected to an input gear G1. That is, the input gear G1 is one of the plurality of gears G that transmits the driving force from the rotary electric machine MG to the differential gear mechanism DF, and corresponds to a first gear connected to the rotor 82 of the rotary electric machine MG so as to rotate integrally with the rotor 82. The input gear G1 is drivingly connected to the counter gear mechanism CG.

As shown in FIGS. 6, 11, etc., the counter gear mechanism CG is disposed on the third axis A3 parallel to the first axis A1 and the second axis A2, and drivingly connects the rotary electric machine MG and the differential gear mechanism DF via the input gear G1. In common between the first embodiment and the second embodiment, the counter gear mechanism CG includes two gears (counter driven gear G2 and counter drive gear G3) connected by a shaft member. That is, the counter gear mechanism CG includes the counter driven gear G2 (third gear) that is disposed on the third axis A3 and meshes with the input gear G1 (first gear), and the counter drive gear G3 (fourth gear) that rotates integrally with the counter driven gear G2 and meshes with a differential input gear G4 (second gear) described later.

Figure 3:
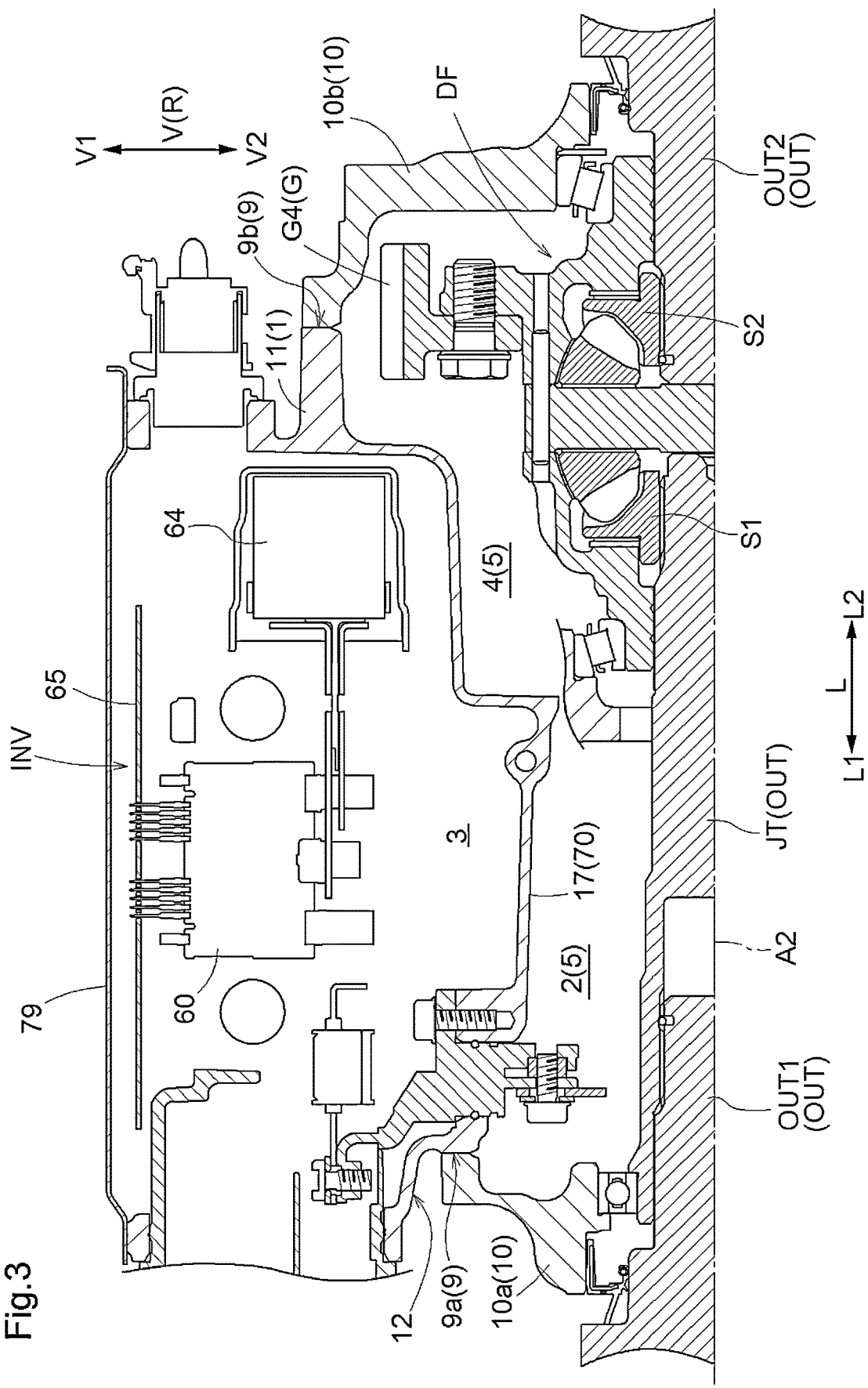
FIG. 3 is an axial partial sectional view of the vehicle drive device of the first embodiment.

As shown in FIGS. 6 and 11, the differential gear mechanism DF is drivingly connected to the wheels W via the output members OUT. As shown in FIGS. 2, 3, and 8, the differential gear mechanism DF includes a plurality of bevel gears that meshes with each other, and transmits rotation and torque input to the differential input gear G4 (second gear) so that the rotation and torque are distributed to the pair of output members OUT (that is, the pair of wheels W) via a first side gear S1 and a second side gear S2. The differential input gear G4 connected to the differential gear mechanism DF so as to rotate integrally with the differential gear mechanism DF is one of the plurality of gears G that transmits the driving force from the rotary electric machine MG to the differential gear mechanism DF, and corresponds to the second gear that is connected to the differential gear mechanism DF and transmits the driving force from the rotary electric machine MG to the differential gear mechanism DF. As shown in FIGS. 2, 3, and 8, the differential gear mechanism DF distributes the driving force of the rotary electric machine MG transmitted via the differential input gear G4 to a first output member OUT1 and a second output member OUT2. As a result, the vehicle drive device 100 can cause the vehicle to travel by transmitting the torque of the rotary electric machine MG to the wheels W. As a matter of course, the first side gear S1 and the second side gear S2 are included in the differential gear mechanism DF but not included in the output members OUT.

As shown in FIG. 7, the drive of the rotary electric machine MG is controlled by the inverter device INV. In common between the first embodiment and the second embodiment, the inverter device INV is also housed in the case 1 (case body 11). The inverter device INV includes an inverter circuit 60 that converts electric power between direct current power and multi-phase alternating current power. The inverter circuit 60 is connected to the alternating-current rotary electric machine MG and the high-voltage battery BH and converts electric power between direct current and multi-phase alternating current (in this case, three phases that are a U phase, a V phase, and a W phase). The high-voltage battery BH is composed of, for example, a secondary battery (battery) such as a nickel-metal hydride battery or a lithium ion battery, or an electric double layer capacitor. When the rotary electric machine MG is the driving force source of the vehicle, the high-voltage battery BH is a direct current power source having a large voltage and a large capacity, and the rated power source voltage is, for example, 200 to 400 [V]. The inverter circuit 60 includes a direct-current link capacitor 64 (smoothing capacitor) for smoothing a voltage between a positive electrode power source line P and a negative electrode power source line N for direct current (direct-current link voltage Vdc). The direct-current link capacitor 64 stabilizes the direct-current link voltage Vdc that fluctuates in response to the fluctuation in power consumption of the rotary electric machine MG.

The inverter circuit 60 includes a plurality of switching elements. Specifically, the inverter circuit 60 includes a plurality of (in this case, three) arms for single-phase alternating currents, each structured by a series circuit of an upper switching element and a lower switching element. It is preferable that a power semiconductor element capable of operating at a high frequency, such as an insulated gate bipolar transistor (IGBT), a power metal oxide semiconductor field effect transistor (MOSFET), a silicon carbide-metal oxide semiconductor FET (SiC-MOSFET), a SiC-static induction transistor (SiC-SIT), and a gallium nitride-MOSFET (GaN-MOSFET) be applied to the switching elements. As shown in FIG. 7, in the present embodiment, description is given of an exemplary form in which the IGBT is used as each switching element. In the present embodiment, a switching element module is structured such that the inverter circuit 60, including freewheeling diodes as well, is integrated into one power module.

As shown in FIG. 7, the inverter circuit 60 is controlled by an inverter control device 65 (M-CTRL). The inverter control device 65 is constructed with a logic circuit such as a microcomputer as a core member. The inverter control device 65 performs, based on a target torque of the rotary electric machine MG, current feedback control using a known vector control method, and controls the rotary electric machine MG via the inverter circuit 60. The target torque of the rotary electric machine MG is, for example, provided as a request signal from other control devices such as a vehicle control device 91 (VCL-CTRL) that is one of the higher-order control devices in the vehicle. An actual current flowing through the stator coil 83 of each phase of the rotary electric machine MG is detected by a current sensor 84. Further, a magnetic pole position of the rotor of the rotary electric machine MG at each time point is detected by a rotation sensor 85 such as a resolver.

The inverter control device 65 performs the current feedback control by using detection results from the current sensor 84 and the rotation sensor 85. The inverter control device 65 includes various functional units for the current feedback control, and each of the functional units is implemented by cooperation between hardware such as a microcomputer and software (program).

The vehicle control device 91 and the inverter control device 65 are low-voltage circuits that operate by being supplied with electric power from a low-voltage battery BL (low-voltage direct current power source) that is a power source with a lower voltage (for example, 12 to 24 [V]) than that of the high-voltage battery BH. Therefore, the inverter control device 65 includes a driving circuit that enhances and relays a driving capacity (capacity for operating a subsequent circuit, such as a voltage amplitude and output current) of a switching control signal (in the case of the IGBT, a gate driving signal) for each switching element. The inverter control device 65 is structured by mounting the above microcomputer, its peripheral circuits, and circuit components constituting the driving circuit on one or more substrates.

The inverter device INV is structured as a unit including the inverter control device 65, the direct-current link capacitor 64, and the inverter circuit 60 (power module) described above (see FIGS. 3, 7, etc.). The inverter device INV as a unit is disposed in the inverter housing chamber 3 (second housing chamber) and fixed to the case 1 with fastening members such as bolts. The phrase "overlap the inverter device INV" herein refers to a state of overlap with one or more of the constituent elements of the inverter device INV.

As described above, the case body 11 is integrally formed so as to form the device housing chamber 5 that houses the rotary electric machine MG and the plurality of gears G and the inverter housing chamber 3 that houses the inverter device INV. For example, in the first embodiment, as shown in the perspective view of FIG. 1 and the diagram of FIG. 4 viewed in the axial direction, the case body 11 includes a peripheral wall portion 6 that surrounds an outer side of the rotary electric machine MG and the gears G in the radial direction R, and the partition wall 70 that partitions the device housing chamber 5 and the inverter housing chamber 3. The partition wall 70 overlaps the rotary electric machine MG (see FIG. 5) and at least one of the plurality of gears G (see FIG. 2) in the axial direction L. Similarly, in the second embodiment, as shown in the diagram of FIG. 9 viewed in the axial direction, the case body 11 includes the peripheral wall portion 6 that surrounds the outer side of the rotary electric machine MG and the gears G in the radial direction R, and the partition wall 70 that partitions the device housing chamber 5 and the inverter housing chamber 3. As shown in FIG. 8, the partition wall 70 overlaps the rotary electric machine MG and at least one of the plurality of gears G in the axial direction L.

Hereinafter, more detailed structures will be described separately for the first embodiment and the second embodiment. Description of common matters may be omitted as appropriate.

First Embodiment

The device housing chamber 5 includes a rotary electric machine housing chamber 2 that houses the rotary electric machine MG, and a gear housing chamber 4 that houses the plurality of gears G. The counter gear mechanism CG and the differential gear mechanism DF are also housed in the gear housing chamber 4. As shown in FIG. 2, the case body 11 includes a partition member 8 disposed between the rotary electric machine housing chamber 2 and the gear housing chamber 4 in the axial direction L. The partition member 8 extends in the width direction H as indicated by a virtual line in FIG. 5. The partition member 8 may be a separate member independent of the case body 11 and fixed to the case body 11 with a fastening member or the like, or may be formed integrally with the case body 11 by casting or the like (the same applies to the second embodiment). As a matter of course, the device housing chamber 5 need not essentially be partitioned into the plurality of housing chambers by the partition member 8 (the same applies to the second embodiment).

The rotary electric machine housing chamber 2 and the gear housing chamber 4 are not strictly partitioned by the partition member 8 but communicate with each other. The rotary electric machine MG is disposed on the first axial side L1 of the partition member 8 to form the rotary electric machine housing chamber 2, and the plurality of gears G is disposed on the second axial side L2 of the partition member 8 to form the gear housing chamber 4. Although not clearly shown in the axial sectional view of FIG. 2, the partition wall 70 is formed on both sides in the axial direction L across the partition member 8 as indicated by the virtual line in the top view of FIG. 5.

The case 1 includes, in addition to the case body 11, the cover portion 10 joined to the case body 11 from at least one side in the axial direction L. Description is herein given of an exemplary form including two cover portions 10 joined to the case body 11 from both sides in the axial direction L. That is, as shown in FIGS. 1, 2, etc., the case 1 includes the first cover portion 10*a* joined at a first joint surface 9*a* to the case body 11 from the first axial side L1, and the second cover portion 10*b* connected at a second joint surface 9*b* to the case body 11 from the second axial side L2. The rotary electric machine housing chamber 2 is formed across the case body 11 and the cover portion 10 (first cover portion 10*a*). The gear housing chamber 4 is formed across the case body 11 and the cover portion (second cover portion 10*b*).

As shown in FIG. 2, the device housing chamber 5 houses first bearings B1 (rotor bearings) that rotatably support the rotary electric machine MG, and a second bearing B2 (output bearing) that rotatably supports the output member OUT (in this case, the first output member OUT1). A rotor shaft 82*a* of the rotary electric machine MG is rotatably supported by the first bearings B1 on both the first axial side L1 and the second axial side L2. The first bearing B1 on the first axial side L1 will be referred to as "first rotor bearing B1*a*". The first bearing B1 on the second axial side L2 will be referred to as "second rotor bearing B1*b*". The first rotor bearing B1*a* is supported by the first cover portion 10*a*. The second rotor bearing B1*b* is supported by the partition member 8 functioning as a support wall.

The first output member OUT1 is supported by the second bearing B2 on the first axial side L1, and is connected to a connecting shaft JT on the second axial side L2. The connecting shaft JT is connected to the first side gear S1 of the differential gear mechanism DF on the second axial side L2. The second output member OUT2 is connected to the second side gear S2 of the differential gear mechanism DF on the first axial side. The second bearing B2 is supported by the first cover portion 10a similarly to the first bearing B1. Seal members for sealing through holes for the output members OUT are attached to the cover portions 10.

Figure 4:
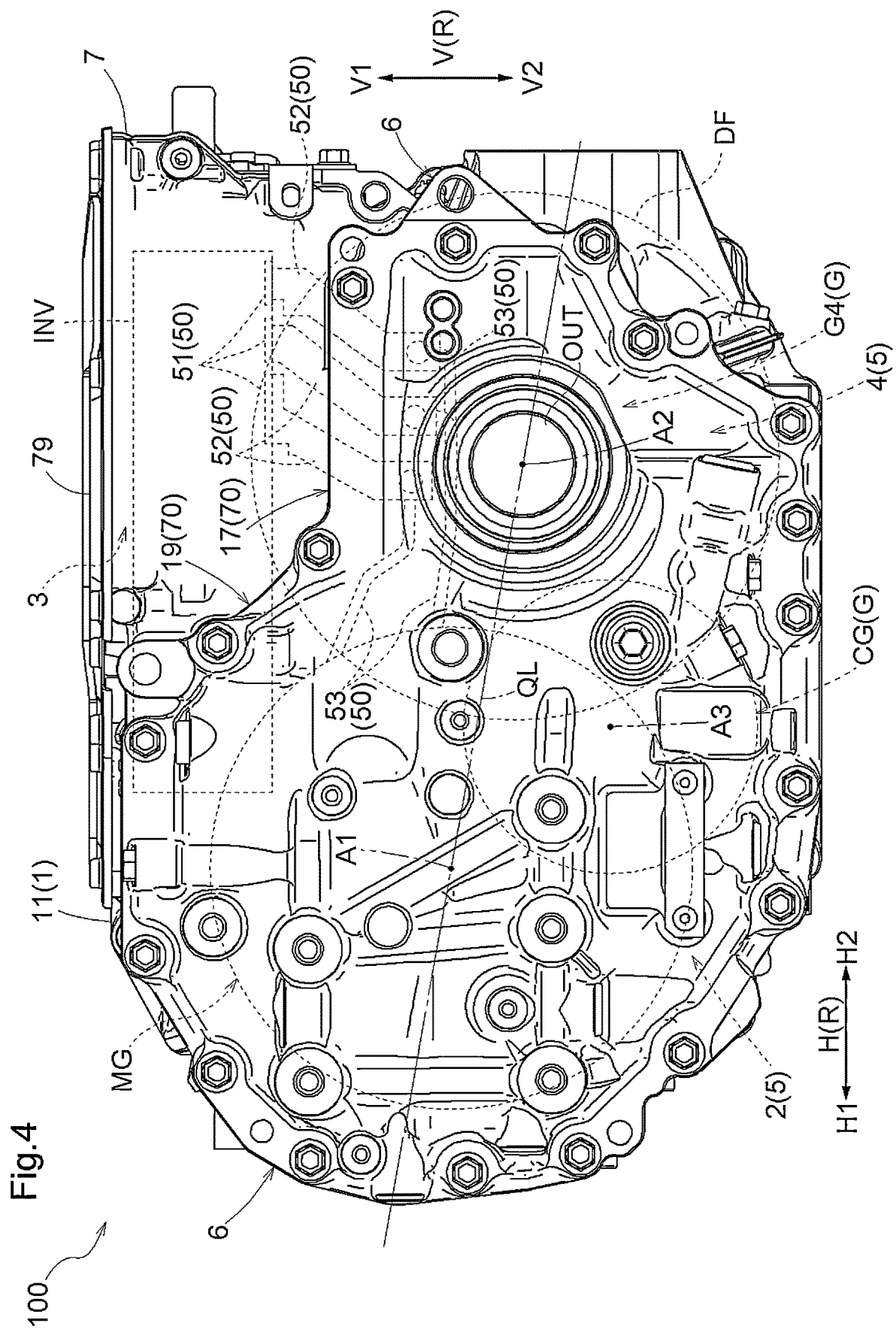
FIG. 4 is a diagram of the vehicle drive device of the first embodiment when viewed in an axial direction.

The gear housing chamber 4 also houses the counter gear mechanism CG. As shown in FIG. 4, the third axis A3 on which the counter gear mechanism CG is disposed is located, in the vertical direction V, below (on the second vertical side V2 of) a virtual plane QL connecting the first axis A1 and the second axis A2. In the first embodiment, the counter driven gear G2 (third gear) is disposed closer to the rotary electric machine MG in the axial direction L than the counter drive gear G3 (fourth gear).

With the partition member 8, the rotary electric machine housing chamber 2 and the gear housing chamber 4 can appropriately be formed in the integrally formed case body 11. The number of components of the case 1 can be reduced compared to a structure including a case member having the rotary electric machine housing chamber 2 and a case member having the gear housing chamber 4. Since the partition wall 70 is formed on both sides in the axial direction L across the partition member 8, it is easy to secure the rigidity of the device housing chamber 5, the rigidity of the inverter housing chamber 3, and the rigidity of the partition wall 70. When the partition member 8 also functions as the support wall as described above, there is no need to separately provide a space for installing a support member, thereby suppressing an increase in the size of the vehicle drive device 100.

As described above with reference to FIGS. 2 and 5, the partition wall 70 that partitions the device housing chamber 5 and the inverter housing chamber 3 is disposed so as to overlap the rotary electric machine MG and at least one of the plurality of gears G in the axial direction L. In the first embodiment, the partition wall 70 includes the vertical partition wall 17 and the widthwise partition wall 19. As shown in FIGS. 1 to 4, in the first embodiment, the length of the gear housing chamber 4 in the vertical direction V is smaller than the length of the rotary electric machine housing chamber 2 in the vertical direction V. Therefore, the inverter housing chamber 3 is provided with a shift toward the gear housing chamber 4 in the axial direction L. That is, the case body 11 is formed so that the gear housing chamber 4 and the inverter housing chamber 3 are arranged along the vertical direction V and the total length of the gear housing chamber 4 and the inverter housing chamber 3 in the vertical direction V is approximately equal to the length of the rotary electric machine housing chamber 2 in the vertical direction V.

Figure 5:
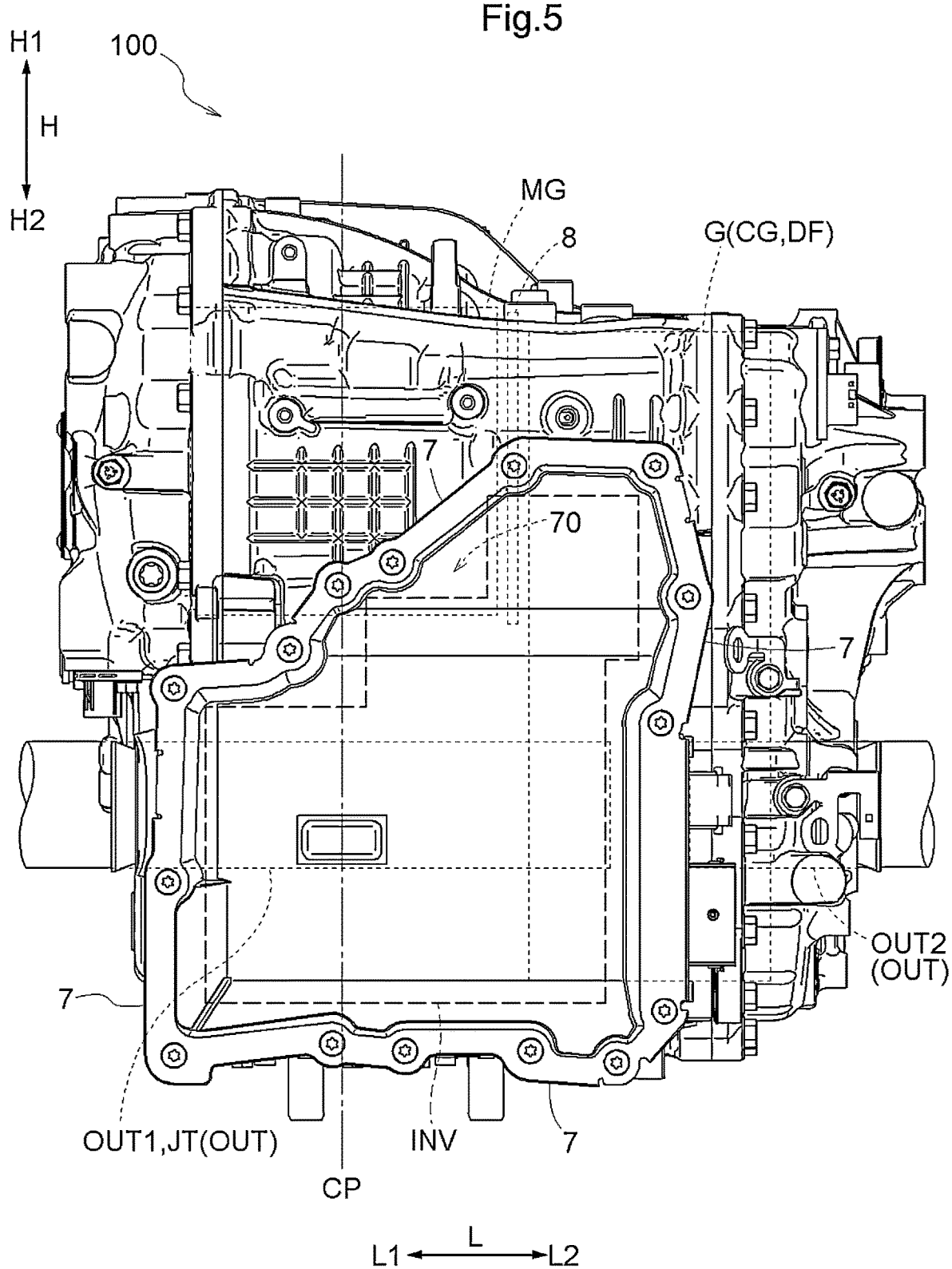
FIG. 5 is a top view of the vehicle drive device of the first embodiment.

Therefore, the partition wall 70 having a sufficient length along the axial direction L is secured above the gear housing chamber 4, and the inverter housing chamber 3 having a sufficient width along the axial direction L is formed. As shown in FIG. 5, the partition wall 70 is formed so as to overlap the rotary electric machine MG in the axial direction L. As shown in FIG. 2, the partition wall 70 is formed so that the disposition area in the axial direction L overlaps the input gear G1, the counter driven gear G2, the counter drive gear G3, and the differential input gear G4. That is, the partition wall 70 is formed so as to extend in the axial direction L from a position where the partition wall 70 overlaps the rotary electric machine MG on the outer side in the radial direction R to a position where the partition wall 70 overlaps at least one of the gears G on the outer side in the radial direction R. In other words, the partition wall 70 overlaps the rotary electric machine MG and at least one of the plurality of gears Gin the axial direction L. The axial position of the partition wall 70 overlaps the axial position of the rotary electric machine MG and the axial position of at least one of the plurality of gears G. When viewed in the radial direction R, the partition wall 70 includes a portion that overlaps the rotary electric machine MG and a portion that overlaps the gear G.

Since a wide disposition area in the axial direction L can be secured for the inverter device INV, it is possible to suppress the increase in the size of the case 1 in a direction orthogonal to the axial direction L (for example, the vertical direction V). Since the case body 11 is integrally formed so as to form the device housing chamber 5 and the inverter housing chamber 3, the number of components of the case 1 can be reduced.

As shown in FIG. 3, the portion of the case body 11 that forms the inverter housing chamber 3 (second housing chamber) includes an overhang portion 12 that extends in the axial direction L from the partition wall 70 and straddles the joint surface 9 between the case body 11 and the cover portion 10. Specifically, the case body 11 includes the overhang portion 12 that overlaps the first joint surface 9a between the case body 11 and the first cover portion 10a. The overhang portion 12 straddles the first joint surface 9a along the axial direction L, and overlaps the first joint surface 9a when viewed in the radial direction R.

With such an overhang portion 12, the inverter housing chamber 3 (second housing chamber) can be provided up to the first axial side L1 of the joint surface 9 (in this case, the first joint surface 9a) between the case body 11 and the cover portion 10 (in this case, the first cover portion 10a).

The overhang portion 12 is formed so as to be spaced away from the joint surface 9 in a direction orthogonal to the axial direction L and project toward the cover portion 10 beyond the joint surface 9. That is, as shown in FIG. 3, the overhang portion 12 is formed so as to be spaced away from the first joint surface 9a in the vertical direction V orthogonal to the axial direction L and project toward the first cover portion 10a beyond the first joint surface 9a.

Since the inverter housing chamber 3 extending in the axial direction L beyond the joint surface 9 does not hinder the joint between the case body 11 and the cover portion 10, the case 1 can be formed properly.

The plurality of gears G disposed in the gear housing chamber 4 includes the input gear G1 (first gear) connected to the rotor 82 of the rotary electric machine MG so as to rotate integrally with the rotor 82, and the differential input gear G4 (second gear) that is connected to the differential gear mechanism DF and transmits the driving force from the rotary electric machine MG. As shown in FIG. 2, the disposition area of the inverter device INV overlaps the disposition areas of both the input gear G1 and the differential input gear G4 in the axial direction L. In other words, the partition wall 70 that partitions the device housing chamber 5 and the inverter housing chamber 3 overlaps the disposition areas of both the input gear G1 and the differential input gear G4 in the plurality of gears G in the axial direction L. As a result, it is possible to suppress the increase in the dimension of the vehicle drive device 100 in the axial direction L.

As described above, the plurality of gears G also includes the gears of the counter gear mechanism CG. The partition wall 70 overlaps at least one of the plurality of gears G in the axial direction L. Since the partition wall 70 overlaps at least one of the counter driven gear G2 (third gear) and the counter drive gear G3 (fourth gear) of the counter gear mechanism CG, a wide disposition area in the axial direction L can be secured for the inverter device INV. Thus, it is possible to suppress the increase in the size of the case 1 in a direction orthogonal to the axial direction L (for example, the vertical direction V). Since the input gear G1 (first gear) meshes with the counter driven gear G2 (third gear), the disposition areas in the axial direction L are substantially the same. Since the differential input gear G4 (second gear) meshes with the counter drive gear G3 (fourth gear), the disposition areas in the axial direction L are substantially the same.

As described above with reference to FIG. 4, in the first embodiment, the third axis A3 on which the counter gear mechanism CG is disposed is located, in the vertical direction V, below the virtual plane QL connecting the first axis A1 and the second axis A2. As shown in FIG. 2, the counter driven gear G2 (third gear) is disposed closer to the rotary electric machine MG in the axial direction L than the counter drive gear G3 (fourth gear). The inverter device INV is positioned above the counter driven gear G2 in the vertical direction V, and is disposed so as to overlap the counter driven gear G2 when viewed in the vertical direction V. In the first embodiment, the inverter device INV is disposed so as to overlap the counter driven gear G2 and the rotary electric machine MG when viewed in the vertical direction V.

Since the third axis A3 on which the counter gear mechanism CG is disposed is located below the first axis A1 and the second axis A2, it is easier to secure a space above the first axis A1 and the second axis A2 than in a case where the third axis A3 is located above the first axis A1 and the second axis A2. Using the space secured in this way, the inverter device INV is positioned on the upper side V1 of the counter driven gear G2 (third gear) of the counter gear mechanism CG to overlap the counter driven gear G2 (third gear) when viewed in the vertical direction V. Thus, it is possible to reduce the size of the vehicle drive device 100 in the vertical direction, thereby downsizing the vehicle drive device 100.

As shown in FIG. 4, three-phase rotary electric machine-side alternating-current busbars 53 connected to the three-phase stator coils 83 of the rotary electric machine MG extend inside the case 1 from the rotary electric machine MG side to the gear housing chamber 4. Alternating-current busbar connectors 52 (alternating-current busbar connection members) are disposed between the gear housing chamber 4 and the inverter housing chamber 3 through the vertical partition wall 17. One end of the alternating-current busbar connector 52 is positioned inside the inverter housing chamber 3. The one end of the alternating-current busbar connector 52 and an inverter-side alternating-current busbar 51 are electrically connected inside the inverter housing chamber 3. Alternating-current power lines 50 include the inverter-side alternating-current busbars 51, the alternating-current busbar connectors 52, and the rotary electric machine-side alternating-current busbars 53. The alternating-current power lines can efficiently be routed by using the space secured by disposing the counter gear mechanism CG on the lower side as described above.

Second Embodiment

As shown in FIG. 8, also in the second embodiment, the device housing chamber 5 includes the rotary electric machine housing chamber 2 that houses the rotary electric machine MG, and the gear housing chamber 4 that houses the plurality of gears G. As in the first embodiment, the case body 11 includes the partition member 8 disposed between the rotary electric machine housing chamber 2 and the gear housing chamber 4 in the axial direction L. The partition member 8 extends in the width direction H as indicated by a virtual line in FIG. 10.

As in the first embodiment, the rotary electric machine housing chamber 2 and the gear housing chamber 4 are not strictly partitioned by the partition member 8 but communicate with each other. The rotary electric machine MG is disposed on the first axial side L1 of the partition member 8 to form the rotary electric machine housing chamber 2, and the plurality of gears G is disposed on the second axial side L2 of the partition member 8 to form the gear housing chamber 4. The partition wall 70 is formed on both sides in the axial direction L across the partition member 8.

As in the first embodiment, the case 1 includes, in addition to the case body 11, the cover portion 10 joined to the case body 11 from at least one side in the axial direction L. Description is herein given of an exemplary form including two cover portions 10 joined to the case body 11 from both sides in the axial direction L. That is, as shown in FIG. 8 etc., the case 1 includes the first cover portion 10*a* joined at the first joint surface 9*a* to the case body 11 from the first axial side L1, and the second cover portion 10*b* connected at the second joint surface 9*b* to the case body 11 from the second axial side L2. The rotary electric machine housing chamber 2 is formed across the case body 11 and the cover portion 10 (first cover portion 10*a*). The gear housing chamber 4 is formed across the case body 11 and the cover portion 10 (second cover portion 10*b*).

As shown in FIG. 8, the device housing chamber 5 houses the first bearings B1 that rotatably support the rotary electric machine MG, and the second bearing B2 that rotatably supports the output member OUT (in this case, the first output member OUT1). The rotor shaft 82*a* of the rotary electric machine MG is rotatably supported by the first bearings B1 on both the first axial side L1 and the second axial side L2. The first bearing B1 on the first axial side L1 will be referred to as "first rotor bearing B1*a*". The first bearing B1 on the second axial side L2 will be referred to as "second rotor bearing B1*b*". The first rotor bearing B1*a* is supported by the first cover portion 10*a*. The second rotor bearing B1*b* is supported by the partition member 8 functioning as the support wall.

The first output member OUT1 is supported by the second bearing B2 on the first axial side L1, and is connected to the connecting shaft JT on the second axial side L2. The connecting shaft JT is connected to the first side gear S1 of the differential gear mechanism DF on the second axial side L2. The second output member OUT2 is connected to the second side gear S2 of the differential gear mechanism DF on the first axial side. The second bearing B2 is supported by the first cover portion 10*a* similarly to the first bearing B1. The seal members for sealing the through holes for the output members OUT are attached to the cover portions 10.

The gear housing chamber 4 also houses the counter gear mechanism CG. Unlike the first embodiment, as shown in FIG. 9, the third axis A3 on which the counter gear mechanism CG is disposed is located, in the vertical direction V, above (on the first vertical side V1 of) the virtual plane QL connecting the first axis A1 and the second axis A2. Unlike the first embodiment, as shown in FIG. 8, the counter drive gear G3 (fourth gear) is disposed closer to the rotary electric machine MG in the axial direction L than the counter driven gear G2 (third gear).

With the partition member 8 as in the first embodiment, the rotary electric machine housing chamber 2 and the gear housing chamber 4 can appropriately be formed in the integrally formed case body 11. The number of components of the case 1 can be reduced compared to the structure including the case member having the rotary electric machine housing chamber 2 and the case member having the gear housing chamber 4. Since the partition wall 70 is formed on both sides in the axial direction L across the partition member 8, it is easy to secure the rigidity of the device housing chamber 5, the rigidity of the inverter housing chamber 3, and the rigidity of the partition wall 70. When the partition member 8 also functions as the support wall as described above, there is no need to separately provide a space for installing a support member, thereby suppressing an increase in the size of the vehicle drive device 100.

As described above with reference to FIGS. 2 and 5, the partition wall 70 that partitions the device housing chamber 5 and the inverter housing chamber 3 is disposed so as to overlap the rotary electric machine MG and at least one of the plurality of gears G in the axial direction L. As shown in FIGS. 8 and 9, in the second embodiment, the length of the rotary electric machine housing chamber 2 in the vertical direction V is substantially equal to the length of the gear housing chamber 4 in the vertical direction V. The inverter housing chamber 3 is formed so as to straddle both the rotary electric machine housing chamber 2 and the gear housing chamber 4 in the axial direction L and the width direction H.

Therefore, the partition wall 70 having sufficient lengths along the axial direction L and the width direction H is secured above the gear housing chamber 4, and the inverter housing chamber 3 having sufficient widths along the axial direction L and the width direction H is formed. As shown in FIG. 8, the partition wall 70 is formed so as to overlap the rotary electric machine MG in the axial direction L. Since a wide disposition area in the axial direction L can be secured for the inverter device INV, it is possible to suppress the increase in the size of the case 1 in a direction orthogonal to the axial direction L (for example, the vertical direction V). As shown in FIG. 8, the partition wall 70 is formed so as to overlap the input gear G1, the counter driven gear G2, the counter drive gear G3, and the differential input gear G4 in the axial direction L.

As shown in FIG. 8, the portion of the case body 11 that forms the inverter housing chamber 3 (second housing chamber) includes the overhang portion 12 that extends in the axial direction L from the partition wall 70 and straddles the joint surface 9 between the case body 11 and the cover portion 10. Specifically, the case body 11 includes the overhang portion 12 that overlaps the second joint surface 9b between the case body 11 and the second cover portion 10b. The overhang portion 12 straddles the second joint surface 9b along the axial direction L, and overlaps the first joint surface 9a when viewed in the radial direction R.

With such an overhang portion 12, the inverter housing chamber 3 (second housing chamber) can be provided up to the second axial side L2 of the joint surface 9 (in this case, the second joint surface 9b) between the case body 11 and the cover portion 10 (in this case, the second cover portion 10b).

The overhang portion 12 is formed so as to be spaced away from the joint surface 9 in a direction orthogonal to the axial direction L and project toward the cover portion 10 beyond the joint surface 9. That is, as shown in FIG. 8, the overhang portion 12 is formed so as to be spaced away from the second joint surface 9b in the vertical direction V orthogonal to the axial direction L and project toward the second cover portion 10b beyond the second joint surface 9b. The gear housing chamber 4 is formed across the case body 11 and the second cover portion 10b. The overhang portion 12 is provided close to the gear housing chamber 4 in the axial direction L.

Since the inverter housing chamber 3 disposed above the gear housing chamber 4 formed across the case body 11 and the second cover portion 10b is disposed so as to straddle the joint surface 9 (second joint surface 9b), the disposition area for the inverter housing chamber 3 in the axial direction L can be secured sufficiently. Since the inverter housing chamber 3 extending in the axial direction L beyond the joint surface 9 does not hinder the joint between the case body 11 and the cover portion 10, the case 1 can be formed properly.

The plurality of gears G disposed in the gear housing chamber 4 includes the input gear G1 (first gear) connected to the rotor 82 of the rotary electric machine MG so as to rotate integrally with the rotor 82, and the differential input gear G4 (second gear) connected to the differential gear mechanism DF so as to rotate integrally with the differential gear mechanism DF. As shown in FIG. 8, the disposition area of the inverter device INV overlaps the disposition areas of both the input gear G1 and the differential input gear G4 in the axial direction L. In other words, the partition wall 70 that partitions the device housing chamber 5 and the inverter housing chamber 3 overlaps the disposition areas of both the input gear G1 and the differential input gear G4 in the plurality of gears G in the axial direction L. As a result, it is possible to suppress the increase in the dimension of the vehicle drive device 100 in the axial direction L.

Also in the second embodiment, the partition wall 70 overlaps at least one of the counter driven gear G2 (third gear) and the counter drive gear G3 (fourth gear) of the counter gear mechanism CG. Since a wide disposition area in the axial direction L can be secured for the inverter device INV, it is possible to suppress the increase in the size of the case 1 in a direction orthogonal to the axial direction L (for example, the vertical direction V).

As described above with reference to FIG. 9, in the second embodiment, the third axis A3 on which the counter gear mechanism CG is disposed is located, in the vertical direction V, above the virtual plane QL connecting the first axis A1 and the second axis A2. As shown in FIG. 8, the counter drive gear G3 (fourth gear) is disposed closer to the rotary electric machine MG in the axial direction L than the counter driven gear G2 (third gear). The inverter device INV is positioned above the counter drive gear G3 in the vertical direction V, and is disposed so as to overlap the counter drive gear G3 when viewed in the vertical direction V.

When the counter gear mechanism CG functions as a speed reduction mechanism, the diameter of the counter driven gear G2 (third gear) is generally larger than that of the counter drive gear G3 (fourth gear). In this structure, the inverter device INV is disposed so as to overlap, when viewed in the vertical direction V, the rotary electric machine MG and the counter drive gear G3 having a relatively small gear diameter to avoid contact with the counter driven gear G2 having a relatively large gear diameter. Therefore, even in the case where the third axis A3 of the counter gear mechanism CG is located above the first axis A1 and the second axis A2, the inverter device INV can be disposed on a relatively lower side. Thus, it is possible to suppress the increase in the dimension of the vehicle drive device 100 in the vertical direction V.

In the first embodiment, the efficient routing of the alternating-current power lines 50 using the space secured by disposing the counter gear mechanism CG on the lower side has been described with reference to FIG. 4. In the second embodiment, the counter gear mechanism CG is disposed on the upper side, but the three-phase stator coils 83 of the rotary electric machine MG disposed in the rotary electric machine housing chamber 2 and the inverter-side alternating-current busbars 51 disposed in the inverter housing chamber 3 are electrically connected via the gear housing chamber 4 as shown in FIG. 9. As described above, the inverter device INV overlaps the counter driven gear G2 having a relatively small gear diameter when viewed in the vertical direction V. Therefore, a certain breadth of space is secured between the counter gear mechanism CG and the inverter device INV.

As shown in FIG. 8, the three-phase rotary electric machine-side alternating-current busbars 53 connected to the three-phase stator coils 83 of the rotary electric machine MG extend from the rotary electric machine MG side to the gear housing chamber 4. The alternating-current busbar connectors 52 are disposed between the gear housing chamber 4 and the inverter housing chamber 3 through the partition wall 70. One end of the alternating-current busbar connector 52 is positioned inside the inverter housing chamber 3, and is electrically connected to the inverter-side alternating-current busbar 51 inside the inverter housing chamber 3.

OTHER EMBODIMENTS

Hereinafter, other embodiments will be described. The configurations of the embodiments described below are not limited to those applied independently, and can be applied in combination with the configurations of the other embodiments as long as there is no contradiction.

(1) In the above, description has been given of the exemplary three-axis vehicle drive device 100 in which the rotary electric machine MG is disposed on the first axis A1, the differential gear mechanism DF is disposed on the second axis A2, and the counter gear mechanism CG is disposed on the third axis A3. However, the vehicle drive device 100 may have a structure in which the rotary electric machine MG, the differential gear mechanism DF, and the counter gear mechanism CG are disposed coaxially. The vehicle drive device 100 may have two axes that are the first axis A1 and the second axis A2 parallel to each other. The vehicle drive device 100 may have a structure in which one or more axes different from the first axis A1, the second axis A2, and the third axis A3 are further provided in parallel and therefore four or more axes are provided in parallel.

(2) In the above, description has been given of the exemplary vehicle drive device 100 including the rotary electric machine MG as the driving force source for the wheels W. The vehicle drive device 100 may be a hybrid drive device including both an engine and the rotary electric machine MG as the driving force source for the wheels W of the vehicle (various types of hybrid drive device such as a so-called one-motor parallel type and a so-called two-motor split type).

(3) In the above, description has been given of the exemplary form including the two cover portions 10 joined to the case body 11 from both sides in the axial direction L. However, the case body 11 may be closed on one side in the axial direction L and have the cover portion 10 only on the other side in the axial direction L.

Outline of Embodiments

Hereinafter, the outline of the vehicle drive device (100) described above will be described briefly.

In one aspect, the vehicle drive device includes a rotary electric machine (MG), a plurality of gears (G) provided in a power transmission path from the rotary electric machine (MG), a differential gear mechanism (DF) configured to distribute a driving force transmitted from the rotary electric machine (MG) via the plurality of gears (G) to a pair of wheels (W), and an inverter device (INV) configured to control drive of the rotary electric machine (MG). The vehicle drive device further includes a case (1) including a case body (11) that is integrally formed so as to form a first housing chamber (5) that houses the rotary electric machine (MG) and the plurality of gears (G) and a second housing chamber (3) that houses the inverter device (INV). The first housing chamber (5) includes a rotary electric machine housing chamber (2) that houses the rotary electric machine (MG), and a gear housing chamber (4) that houses the plurality of gears (G). The case body (11) includes a peripheral wall portion (6) that surrounds a radially outer side of the rotary electric machine (MG) and the gears (G), a partition wall (70) that partitions the first housing chamber (5) and the second housing chamber (3), and a partition member (8) disposed between the rotary electric machine housing chamber (2) and the gear housing chamber (4) in the first housing chamber (5). Assuming that a direction along a rotation axis of the rotary electric machine (MG) is an axial direction (L), the partition wall (70) is formed on both sides in the axial direction (L) across the partition member (8) so as to extend in the axial direction (L) from a position where the partition wall (70) overlaps the rotary electric machine (MG) on the radially outer side to a position where the partition wall (70) overlaps at least one of the gears (G) on the radially outer side.

According to this structure, a wide disposition area in the axial direction (L) can be secured for the inverter device (INV). Thus, it is possible to suppress the increase in the size of the case (1) in a direction orthogonal to the axial direction (L) (for example, the vertical direction (V)). Since the case body (11) is integrally formed so as to form the first housing chamber (5) and the second housing chamber (3), the number of components of the case (1) can be reduced. With the partition member (8), the rotary electric machine housing chamber (2) and the gear housing chamber (4) can appropriately be formed in the integrally formed case body (11). The number of components of the case (1) can be reduced compared to a structure including a case member having the rotary electric machine housing chamber (22) and a case member having the gear housing chamber (4). Since the partition wall (70) is formed on both sides in the axial direction (L) across the partition member (8), it is easy to secure the rigidity of the first housing chamber (5), the rigidity of the second housing chamber (3), and the rigidity of the partition wall (70). That is, according to this structure, it is possible to provide the vehicle drive device (100) in which the rotary electric machine (MG), the drive transmission mechanism including the plurality of gears (G), and the inverter device (INV) are housed in the case (1) while suppressing the increase in the size of the entire device in the vertical direction (V) and the horizontal direction.

In the vehicle drive device (100), it is preferable that a rotor bearing (B1) that rotatably supports a rotor (82) of the rotary electric machine (MG) be supported by the partition member (8).

According to this structure, the partition member (8) also functions as a support wall for supporting the rotor bearing (B1) and the rotor (82). Therefore, there is no need to separately provide a space for installing a support member, thereby suppressing the increase in the size of the vehicle drive device (100).

It is preferable that the vehicle drive device include output members (OUT) drivingly connected to the pair of wheels (W), and a connecting shaft (JT) that connects one (OUT1) of the pair of output members (OUT) and the differential gear mechanism (DF), and the partition wall (70) be formed so as to overlap the connecting shaft (JT) when viewed in the vertical direction.

Since the partition wall (70) extends to the position where the partition wall (70) overlaps the connecting shaft (JT) that connects the output member (OUT) and the differential gear mechanism (DF), it is possible to sufficiently secure the internal space of the second housing chamber (3) that houses the inverter (INV) while suppressing the increase in the size of the entire device.

It is preferable that, assuming that a side in the axial direction (L) where the rotary electric machine (MG) is disposed with respect to the plurality of gears (G) is a first axial side (L1), the partition wall (70) be formed so as to extend up to the first axial side (L1) of a central position (CP) of a disposition area of the rotary electric machine (MG) in the axial direction (L).

According to this structure, the partition wall (70) overlaps the rotary electric machine (MG) when viewed in the vertical direction in an area equal to or wider than half of the disposition area of the rotary electric machine (MG) in the axial direction (L). Thus, it is possible to sufficiently secure the internal space of the second housing chamber (3).

It is preferable that the case (1) include, in addition to the case body (11), a cover portion (10) joined to the case body (11) from at least one side in the axial direction (L), and a portion of the case body (11) that forms the second housing chamber (3) include an overhang portion (12) that extends in the axial direction (L) from the partition wall (8) and overlaps a joint surface (9) between the case body (11) and the cover portion (10).

With such an overhang portion (12), the second housing chamber (3) can be provided up to one side in the axial direction with respect to the joint surface (9) between the case body (11) and the cover portion 10.

In the case where the overhang portion (12) is provided as described above, it is preferable that the overhang portion (12) be formed so as to be spaced away from the joint surface (9) in a direction orthogonal to the axial direction (L) and project toward the cover portion (10) beyond the joint surface (9).

According to this structure, the second housing chamber (3) extending in the axial direction (L) beyond the joint surface (9) does not hinder the joint between the case body (11) and the cover portion (10). Therefore, the case (1) can be formed properly.

In the case where the overhang portion (12) is provided as described above, it is preferable that the overhang portion (12) be provided close to the gear housing chamber (4) in the axial direction (L) and the gear housing chamber (4) be formed across the case body (11) and the cover portion (10).

The inverter housing chamber (3) is disposed above the gear housing chamber (4) formed across the case body (11) and the cover portion (10). Since the second housing chamber (3) is disposed so as to straddle the joint surface (9), it is possible to sufficiently secure the disposition area of the second housing chamber (3) in the axial direction (L). Since the second housing chamber (3) extending in the axial direction (L) beyond the joint surface (9) does not hinder the joint between the case body (11) and the cover portion (10), the case (1) can be formed properly.

In the vehicle drive device (100), it is preferable that the plurality of gears (G) include a first gear (G1) connected to the rotor (82) of the rotary electric machine (MG) so as to rotate integrally with the rotor (82), and a second gear (G4) connected to the differential gear mechanism (DF) so as to rotate integrally with the differential gear mechanism (DF), and a disposition area of the inverter device (INV) overlap disposition areas of both the first gear (G1) and the second gear (G4) in the axial direction (L).

According to this structure, it is possible to suppress the increase in the dimension of the vehicle drive device (100) in the axial direction (L).

In the vehicle drive device (100), it is preferable that the rotary electric machine (MG) be disposed on a first axis (A1), the differential gear mechanism (DF) be disposed on a second axis (A2) that is a different axis parallel to the first axis (A1), the plurality of gears (G) include a first gear (G1) connected to the rotor (82) of the rotary electric machine (MG) so as to rotate integrally with the rotor (82), and a second gear (G4) connected to the differential gear mechanism (DF) and configured to transmit the driving force from the rotary electric machine (MG), and the vehicle drive device (100) further include a counter gear mechanism (CG) including a third gear (G2) that is disposed on a third axis (A3) parallel to the first axis (A1) and the second axis (A2) and meshes with the first gear (G1), and a fourth gear (G3) that is configured to rotate integrally with the third gear (G2) and meshes with the second gear (G4).

According to this structure, the plurality of gears (G) also includes the gears of the counter gear mechanism (CG). The partition wall (70) overlaps at least one of the plurality of gears (G) in the axial direction (L). When the partition wall (70) overlaps at least one of the third gear (G2) and the fourth gear (G3) of the counter gear mechanism (CG), a wide disposition area in the axial direction (L) can be secured for the inverter device (INV). As a result, it is possible to suppress the increase in the size of the case (1) in a direction orthogonal to the axial direction (L) (for example, the vertical direction (V)).

In the case where the vehicle drive device (100) includes the counter gear mechanism (CG) as described above, it is preferable that the third axis (A3) be located, in the vertical direction (V), on a lower side (V2) of a virtual plane (QL) connecting the first axis (A1) and the second axis (A2), the third gear (G2) be disposed closer to the rotary electric machine (MG) in the axial direction (L) than the fourth gear (G3), and the inverter device (INV) be positioned on an upper side (V1) of the third gear (G2) in the vertical direction (V) and disposed so as to overlap the third gear (G2) and the rotary electric machine (MG) when viewed in the vertical direction.

Since the third axis (A3) on which the counter gear mechanism (CG) is disposed is located on the lower side (V2) of the first axis (A1) and the second axis (A2), it is easier to secure a space on the upper side (V1) of the first axis (A1) and the second axis (A2) than in a case where the third axis (A3) is located on the upper side (V1) of the first axis (A1) and the second axis (A2). Using the space secured in this way, the inverter device (INV) can be positioned on the upper side (V1) of the third gear (G2) of the counter gear mechanism (CG) to overlap the third gear (G2) when viewed in the vertical direction. Thus, it is possible to reduce the size of the vehicle drive device (100) in the vertical direction (V), thereby downsizing the vehicle drive device (100).

In the case where the vehicle drive device (100) includes the counter gear mechanism (CG) as described above, it is preferable, as another structure, that the third axis (A3) be located, in the vertical direction (V), on the upper side (V1) of the virtual plane (QL) connecting the first axis (A1) and the second axis (A2), the fourth gear (G3) be disposed closer to the rotary electric machine (MG) in the axial direction (L) than the third gear (G2), and the inverter device (INV) be positioned on the upper side (V1) of the fourth gear (G3) and the rotary electric machine (MG) in the vertical direction (V) and disposed so as to overlap the fourth gear (G3) and the rotary electric machine (MG) when viewed in the vertical direction.

When the counter gear mechanism (CG) functions as a speed reduction mechanism, the diameter of the third gear (G2) on the input side is generally larger than that of the fourth gear (G3) on the output side. In this structure, the inverter device (INV) is disposed so as to overlap, when viewed in the vertical direction, the rotary electric machine (MG) and the fourth gear (G3) having a relatively small gear diameter to avoid contact with the third gear (G2) having a relatively large gear diameter. Therefore, even in the case where the third axis (A3) of the counter gear mechanism (CG) is located on the upper side (V1) of the first axis (A1) and the second axis (A2), the inverter device (INV) can be disposed on the relatively lower side (V2). Thus, it is possible to suppress the increase in the dimension of the vehicle drive device (100) in the vertical direction (V).

DESCRIPTION OF THE REFERENCE NUMERALS

1: case, 2: rotary electric machine housing chamber, 3: inverter housing chamber (second housing chamber), 4: gear housing chamber, 5: device housing chamber (first housing chamber), 6: peripheral wall portion, 8: partition member, 9: joint surface, cover portion, 11: case body, 12: overhang portion, 70: partition wall, 82: rotor, 100: vehicle drive device, A1: first axis, A2: second axis, A3: third axis, B1: first bearing (rotor bearing), CG: counter gear mechanism, CP: central position, DF: differential gear mechanism, G: gear, G1: input gear (first gear), G2: counter driven gear (third gear), G3: counter drive gear (fourth gear), G4: differential input gear (second gear), INV: inverter device, L: axial direction, MG: rotary electric machine, QL: virtual plane, R: radial direction, V: vertical direction, V1: first vertical side (upper side), V2: second vertical side (lower side), W: wheel

The invention claimed is:
1. A vehicle drive device comprising:
a rotary electric machine;
a plurality of gears provided in a power transmission path from the rotary electric machine;
a differential gear mechanism configured to distribute a driving force transmitted from the rotary electric machine via the plurality of gears to a pair of wheels;
an inverter device configured to control drive of the rotary electric machine, wherein
the vehicle drive device further includes a case including a case body that is integrally formed so as to form a first housing chamber that houses the rotary electric machine and the plurality of gears and a second housing chamber that houses the inverter device,
the first housing chamber includes a rotary electric machine housing chamber that houses the rotary electric machine, and a gear housing chamber that houses the plurality of gears,
the case body includes a peripheral wall portion that surrounds a radially outer side of the rotary electric machine and the gears, a partition wall that partitions the first housing chamber and the second housing chamber, and a partition member disposed between the rotary electric machine housing chamber and the gear housing chamber in the first housing chamber,
a direction along a rotation axis of the rotary electric machine is an axial direction, and
the partition wall is formed on both sides in the axial direction across the partition member so as to extend in the axial direction from a position where the partition wall overlaps the rotary electric machine on the radially outer side to a position where the partition wall overlaps at least one of the gears on the radially outer side;
output members drivingly connected to the pair of wheels, and a connecting shaft that connects one of a pair of the output members and the differential gear mechanism, wherein
the partition wall is formed so as to overlap the connecting shaft when viewed in a vertical direction.

2. The vehicle drive device according to claim 1, wherein a rotor bearing that rotatably supports a rotor of the rotary electric machine is supported by the partition member.

3. The vehicle drive device according to claim 1, wherein, the side in the axial direction where the rotary electric machine is disposed with respect to the plurality of gears is a first axial side,
the partition wall is formed so as to extend up to the first axial side of a central position of a disposition area of the rotary electric machine in the axial direction.

4. The vehicle drive device according to claim 1, wherein the plurality of gears includes a first gear connected to a rotor of the rotary electric machine so as to rotate integrally with the rotor, and a second gear connected to the differential gear mechanism so as to rotate integrally with the differential gear mechanism, and
a disposition area of the inverter device overlaps disposition areas of both the first gear and the second gear in the axial direction.

5. A vehicle drive device comprising:
a rotary electric machine;
a plurality of gears provided in a power transmission path from the rotary electric machine;
a differential gear mechanism configured to distribute a driving force transmitted from the rotary electric machine via the plurality of gears to a pair of wheels; and
an inverter device configured to control drive of the rotary electric machine, wherein
the vehicle drive device further includes a case including a case body that is integrally formed so as to form a first housing chamber that houses the rotary electric machine and the plurality of gears and a second housing chamber that houses the inverter device,
the first housing chamber includes a rotary electric machine housing chamber that houses the rotary electric machine, and a gear housing chamber that houses the plurality of gears, the case body includes a peripheral wall portion that surrounds a radially outer side of the rotary electric machine and the gears, a partition wall that partitions the first housing chamber and the second housing chamber, and a partition member disposed between the rotary electric machine housing chamber and the gear housing chamber in the first housing chamber, a direction along a rotation axis of the rotary electric machine is an axial direction, the partition wall is formed on both sides in the axial direction across the partition member so as to extend in the axial direction from a position where the partition wall overlaps the rotary electric machine on the radially outer side to a position where the partition wall overlaps at least one of the gears on the radially outer side, the case includes, in addition to the case body, a cover portion joined to the case body from the side in the axial direction where the gears are disposed, and a portion of the case body that forms the second housing chamber includes an overhang portion that extends in the axial direction from the partition wall and overlaps a joint surface between the case body and the cover portion.

6. The vehicle drive device according to claim 5, wherein the overhang portion is formed so as to be spaced away from the joint surface in a direction orthogonal to the axial direction and project toward the cover portion beyond the joint surface.

7. The vehicle drive device according to claim 5, wherein the overhang portion is provided close to the gear housing chamber in the axial direction, and
the gear housing chamber is formed across the case body and the cover portion.

8. A vehicle drive device comprising:
a rotary electric machine;
a plurality of gears provided in a power transmission path from the rotary electric machine;
a differential gear mechanism configured to distribute a driving force transmitted from the rotary electric machine via the plurality of gears to a pair of wheels; and
an inverter device configured to control drive of the rotary electric machine, wherein
the vehicle drive device further includes a case including a case body that is integrally formed so as to form a first housing chamber that houses the rotary electric machine and the plurality of gears and a second housing chamber that houses the inverter device, the first housing chamber includes a rotary electric machine housing chamber that houses the rotary electric machine, and a gear housing chamber that houses the plurality of gears, the case body includes a peripheral wall portion that surrounds a radially outer side of the rotary electric machine and the gears, a partition wall that partitions the first housing chamber and the second housing chamber, and a partition member disposed between the rotary electric machine housing chamber and the gear housing chamber in the first housing chamber, a direction along a rotation axis of the rotary electric machine is an axial direction, the partition wall is formed on both sides in the axial direction across the partition member so as to extend in the axial direction from a position where the partition wall overlaps the rotary electric machine on the radially outer side to a position where the partition wall overlaps at least one of the gears on the radially outer side, the rotary electric machine is disposed on a first axis that serves as the rotation axis of the rotary electric machine, the differential gear mechanism is disposed on a second axis that is a different axis parallel to the first axis, the plurality of gears includes a first gear connected to a rotor of the rotary electric machine so as to rotate integrally with the rotor, and a second gear connected to the differential gear mechanism and configured to transmit the driving force from the rotary electric machine, the vehicle drive device further includes a counter gear mechanism including a third gear that is disposed on a third axis parallel to the first axis and the second axis and meshes with the first gear, and a fourth gear that is configured to rotate integrally with the third gear and meshes with the second gear, the third axis is located, in a vertical direction, on a lower side of a virtual plane connecting the first axis and the second axis, the third gear is disposed closer to the rotary electric machine in the axial direction than the fourth gear, and the inverter device is positioned on an upper side of the third gear in the vertical direction and disposed so as to overlap the third gear and the rotary electric machine when viewed in the vertical direction.

* * * * *